United States Patent [19]

Sheth

[11] Patent Number: 5,576,366
[45] Date of Patent: Nov. 19, 1996

[54] DYEABLE POLYOLEFIN COMPOSITIONS AND METHOD

[75] Inventor: Paresh J. Sheth, Sugar Land, Tex.

[73] Assignee: Lyondell Petrochemical Company, Houston, Tex.

[21] Appl. No.: 442,304

[22] Filed: May 16, 1995

Related U.S. Application Data

[63] Continuation-in-part of Ser. No. 384,716, Feb. 3, 1995, Pat. No. 5,550,192.

[51] Int. Cl.$^6$ .................. D06P 3/79; D01F 6/46; C08L 23/12
[52] U.S. Cl. .................. 524/140; 524/317; 524/318; 525/64; 525/66; 525/166; 525/167; 525/176; 525/177; 8/130.1; 8/497; 8/922; 8/928
[58] Field of Search .................. 525/64, 166, 167, 525/176, 177; 524/140, 317, 318; 8/130.1, 497, 922, 928

[56] References Cited

U.S. PATENT DOCUMENTS

| | | |
|---|---|---|
| 3,361,843 | 1/1968 | Miller et al. . |
| 3,373,222 | 3/1968 | Armstrong . |
| 3,373,223 | 3/1968 | Armstrong . |
| 3,395,198 | 7/1968 | Taniguchi et al. . |
| 3,454,512 | 7/1969 | Ahmed . |
| 3,653,803 | 4/1972 | Hammer . |
| 4,368,295 | 1/1983 | Newton et al. .................. 525/166 |
| 4,557,958 | 12/1985 | Barkis et al. .................. 428/36 |
| 4,782,110 | 1/1988 | Wolfe .................. 524/522 |
| 4,853,290 | 8/1989 | Yanidis .................. 525/221 |
| 5,017,658 | 5/1991 | Noma et al. .................. 525/195 |
| 5,358,537 | 10/1994 | Kelly et al. .................. 8/464 |
| 5,464,687 | 11/1995 | Sheth .................. 428/286 |
| 5,468,259 | 11/1995 | Sheth et al. .................. 8/497 |

FOREIGN PATENT DOCUMENTS

| | | |
|---|---|---|
| 6795 | 3/1968 | Japan . |
| 30944 | 10/1970 | Japan .................. 525/64 |
| 30945 | 10/1970 | Japan . |
| 061453 | 5/1981 | Japan .................. 525/64 |
| 074168 | 6/1981 | Japan .................. 525/64 |

OTHER PUBLICATIONS

Article: "Cosmetic Ingredients" by Eastman Chemical Company.
Article: "The Influence of Polymer Morphology on the Dyeing Properties of Synthetic Fibers", in Rev. Prog. Coloration, vol. 12, 1982, By: Keith Silverstone.
Chapter: "Dyeing of Polypropylene Fibers", in Polypropylene Fibers, Science and Technology, By: Mike Ahmed.
Article: "Surface Dyeable Modified PP BCF Yarns" in Chemiefasern/Textilindustrie, vol. 41/93, Oct. 1991.
Polymer Compounding By: Eastman Chemical Products, Inc.
Article: "Morphological and Mechanical Properties of Extruded Polypropylene/Nylon–6 Blends", By: Wan Gheluwe et al.
Article: "New Functional Materials for Absorbent Products" By: Dr. Suzuki in The Nonwoven World, Fall 1993.
Article: "Dyes for Hydrophonic Fibers", in Textile Research Journal, vol. 28, Apr., 1957, By J. E. Schroeder et al.
Article: "Dyeing Synthetic Fibers" in C&EN, Sep. 1956 By: H. E. Schroeder.

*Primary Examiner*—David Buttner

[57] ABSTRACT

Compositions of ethylene alkyl acrylate grafted onto polypropylene are dyeable with disperse or cationic dyes. A small amount of polyester may be include, along with a hydrophilic modifier comprising a monoglyceride and a salt of a liner alkyl. The hydrophilic modifier also acts as a compatibilizer to bridge the polyester and the polypropylene. A process for dyeing polypropylene fibers comprises combining the polypropylene with a thermoplastic copolymer of ethylene and alkyl acrylates having 1 to 4 carbon atoms in the alkyl group into fibers, adding the polyester to the polypropylene matrix, spinning the composition into fibers, and exposing the fibers to a dye bath. The sulfonic group may be added to the polyester for exposing the fibers to a cationic dye.

91 Claims, No Drawings

DYEABLE POLYOLEFIN COMPOSITIONS AND METHOD

This is a continuation-in-part of Ser. No. 8-384716 filed Feb. 3, 1995 now U.S. Pat. No. 5,550,192.

The present invention relates to an improved dyeable polyolefin composition and to a process for dyeing fibers and nonwoven materials formed from this composition. More particularly, the invention is directed to a disperse-dyeable fiber composition comprising polypropylene, polyester, and a polar material such as ethylene copolymer. The invention is additionally directed to a formulation and process that will allow the use of cationic dyes for polyolefin-based compositions.

BACKGROUND OF THE INVENTION

Polyolefins are hydrophobic and difficult to dye in that they lack dye sites to which dye molecules may become attached. One approach to color polyolefin fibers has been to add colored inorganic salts or stable organometallic pigments to polymer melts prior to fiber spinning. Nonvolatile acids or bases, or materials such as polyethylene oxides or metal salts, have been added to polymers prior to fiber formation to increase the affinity of the fiber for disperse, cationic, acid, or mordant dyes. Polyolefin fibers may be grafted chemically with appropriate monomers after fiber formation to improve dyeability. *Textile Fibers, Dyes, Finishes, and Processes: A Concise Guide*, Howard L. Needles, Noyes Publications, 1986, p. 191.

Efforts to impart acid dyeability to polyolefins, and particularly polypropylene, include the use of nitrogen-based polymer additives. For example, in U.S. Pat. No. 3,361,843, various incompatible, nitrogen-based polymers are added to polypropylene, given a treatment with high concentrations of acidic chemical reagents, and then dyed in an acid dye bath. According to U.S. Pat. No. 3,653,803, dyeing of the polypropylene fiber is somewhat improved by the method of U.S. Pat. No. 3,361,843, but processing of the fiber is difficult due to the incompatible polymer, the dye fastness properties not being reliably reproducible, and tinctorial strengths not being commercially sufficient. In U.S. Pat. Nos. 3,395,198 and 3,653,803, various compatible nitrogen-containing copolymers of ethylene and an aminoalkyl acrylate compound are disclosed that, when blended with polyolefins, render fibers formed from the blend acid dyeable. In U.S. Pat. No. 5,017,658, a fiber finishing agent is used in melt spinning dyeable polypropylene fibers obtained by blending a copolymer of an ethylene aminoalkyl acrylate with polypropylene.

In U.S. Pat. No. 4,557,958, a blend of 70% by weight polypropylene homopolymer and 30% by weight ethylene-methylacrylate copolymer is applied to a fabric of woven polyolefin as a coating stripe to prevent fraying of the fabric when the fabric is cut. In U.S. Pat. No. 4,853,290, a blend of ethylene-acrylic acid copolymer and ethylene-methylacrylate copolymer is coextruded onto a polypropylene film to serve as an adhesive or tie layer to a second polymer.

In U.S. Pat. No. 4,782,110, melt processible multiphase thermoplastic compositions are described that can be formed into various shapes by compression molding, injection molding, blow molding, and extrusion. The composition comprises a blend of crystalline polyolefin resin forming the continuous phase of the composition and a cross-linked elastomer of an ethylene alkyl acrylate copolymer forming the discontinuous phase of a composition. The elastomer consists of units derived from ethylene, an alkyl ester of acrylic acid wherein the alkyl group contains 1 to 6 carbon atoms, and a monoalkyl ester of 1,4-butenedioic acid wherein the alkyl group contains 1 to 6 carbon atoms.

U.S. Pat. Nos. 3,373,222 and 3,373,223 disclose polymeric blends comprising polyolefin resin, polyamide resin, and either a carboxylated polyethylene, an ethylene-acrylic, or a methacrylic acid copolymer. Homogeneous polymeric blends have utility in the preparation of films useful in the packaging industry and in the preparation of plastic bottles and other containers that require a high degree of impermeability.

U.S. Pat. No. 3,454,215 discloses a dyeable polypropylene composition comprising a polyamide and ethylene copolymer. The composition may consist of a uniform admixture of polypropylene, a low molecular weight thermoplastic unreactive polyamide, and an additional polymer selected from a group consisting of copolymers of ethylene and an ethylenically unsaturated ester of a saturated fatty acid or a hydrolyzed product of such copolymers. U.K. Patent Specification No: 998,439 also discloses a thermoplastic composition comprising polyamides and olefin copolymers.

U.S. Pat. No. 5,017,658 discloses a dyeable polypropylene composition including a copolymer of an aminoalkyl acrylate with polypropylene. U.S. Pat. No. 4,368,295 discloses a film produced by a melt extrusion process made from compositions containing an olefin polymer, a linear polyester, and a carboxylated polyolefin. U.S. Pat. No. 4,174,743 discloses split-fiber, thread, and film products comprising polypropylene and one or more polyesters and/or polyamides.

A chapter entitled "Dyeing of Polypropylene Fibers" in *Polypropylene Fibers, Science and Technology* by Mike Ahmed provides a comprehensive study of the technology involved in dyeing polypropylene fibers in the mid 1950s to the 1980s. Section IV. 1 regarding mordant-dyeable fibers discusses problems relating to light fastness, wash fastness, and crock fastness of certain dyes. The study concludes that the fastness properties of disperse-dyeable polypropylene fibers are generally unacceptable to the textile trade.

An article entitled "Surface Dyeable Modified PP BCF Yarns" in *Chemiefasern/Textilindustrie*, Vol. 41/93, October 1991 discusses adding a modifier to PP BCF yarn. A brochure entitled *Polymer Compounding* by Eastman Chemical Products, Inc. discusses Epolene E-43 wax as a compatibilizer for nylon/polypropylene composites. An articles entitled "Morphological and Mechanical Properties of Extruded Polypropylene/Nylon-6 Blends" by Wan Gheluwe et al. discusses nylon and polypropylene blends using Zytel 211 as a compatibilizer. An article entitled "New Functional Materials for Absorbent Products" by Dr. Suzuki in *The New Nonwoven World*, Fall 1993 discusses new polypropylene materials for absorbent products.

In an article entitled "Polymer Morphology on the Dyeing Properties of Synthetic Fibers," Keith Silkstone reviews some of the prior art efforts conducted with regard to proposing morphological changes in the fiber production for marginal dye uptakes in polypropylene. Other relevant articles are "Dyeing Synthetic Fibers," H.E. Schroeder, C&EN, Sep. 10, 1956; "Dyes for Hydrophobic Fibers," H.E. Schroeder et at., *Textile Research Journal*, Vol. 28, April 1957; and "The Influence of Polymer Morphology on the Dyeing Properties of Synthetic Fibers," Keith Silkstone, *Rev. Prog. Coloration*, Vol. 12, 1982.

The need exists for improved polyolefin compositions and materials that will be commercially dyeable with a broad range of dyes. A particular need exists for polypropylene-based compositions that can be used to manufacture fibers that are spinnable and may be formed into fabric sheets including nonwoven fibers.

SUMMARY OF THE INVENTION

A novel polyolefin fiber comprises about 99% to 85% by weight of a polyolefin and a selected amount of an ethylene copolymer comprising about 70 to 82% by weight ethylene and about 30 to 18% by weight of an alkyl acrylate wherein the alkyl has 1 to 4 carbon atoms, said composition containing 0.2 to 3.0% alkyl acrylate by weight the sum of the polypropylene and ethylene copolymer, wherein at least a portion of said copolymer is grafted onto said polyolefin and an effective amount of a disperse dye diffused into the polypropylene to produce a colored fiber. A hydrophilic modifier may be included that comprises a monoglyceride and a long chain hydrocarbon with a hydrophilic group.

A novel process for forming polypropylene-based fibers comprises (a) combining polypropylene with a selected amount of an ethylene copolymer of about 70 to 82% by weight ethylene and about 30 to 18% by weight of an ethylene alkyl acrylate wherein the alkyl group has 1 to 4 carbon atoms to form a composition; (b) extruding the composition into fibers; and (c) exposing the fibers to a selected disperse dye bath containing a disperse dye, either for dyeing or printing.

A novel polyolefin fiber comprises about 99 to 70% by weight polypropylene; a fiber grade polyester of from about 0.1 to 15% by weight; a selected amount of a polar group material, such as an ethylene copolymer, a maleic anhydride, or an acrylic acid; and a hydrophilic modifier comprising a monoglyceride and a salt of a linear alkyl. The polyester may be compounded with the polypropylene/polar group material/hydrophilic modifier matrix. The ethylene copolymer may comprise about 70 to 82% by weight ethylene and about 30 to 18% by weight of an alkyl acrylate, wherein the alkyl has 1 to 4 carbon atoms, said alkyl acrylate present in an amount of 0.2 to 3.0% by weight. The hydrophilic modifier may comprise a fused combination of a monoglyceride and a linear alkyl phosphate and provides additional compatibilization of the polypropylene and polyester. This modifier may be present in an amount of from 0.1 to 2% by weight, and preferably between 0.4 and 1.0% by weight, the sum of the polypropylene, polyester and ethylene copolymer.

A novel process for forming fibers based on polypropylene comprises combining isotactic polypropylene, polyester, a polar group material, and a selected hydrophilic modifier. The polar group material may be ethylene copolymer of about 70 to 82% by weight ethylene and about 30 to 18% by weight of an ethylene alkyl acrylate wherein the alkyl group has 1 to 4 carbon atoms. Alternatively, the polar group material may be a maleic anhydride or an acrylic acid. The hydrophilic modifier may be present in an amount between 0.1 and 2.0% by weight, and preferably between 0.4 and 1.0% by weight, the sum of the polypropylene, polyester, and ethylene copolymer. The polyester or copolyester thus has excellent compatibility to the modified polypropylene. Polyester may be incorporated at a very minute level of about 0.1% by weight up to about 15% by weight. To obtain an acceptable level of dyeability with a high exhaust level and subsequent high light fastness, a desired level of polyester may be between 1 to 10% by weight, with an optimum level at about 3% by weight.

The disperse dye allows for the cost-effective production of fibers that preferably have good light fastness and, in at least some instances, good wash fastness, and good crocking (bleeding) properties. Generally, the dye will have a comparatively high mass to polarity ratio and will be only slightly polar. The rate of dyeing is inversely proportional to the mass of the dye and directly proportional to the linearity and absence of bulky side chains. A dye having low solubility in water and high solubility in fiber is preferred. Dyes generally intended for dyeing acetate fibers or polyester fibers are likely candidates. An open amorphous fiber structure is also preferred. Based on the work that was conducted on several standard dyes, this unique composition exhibits tremendous exhaust characteristics with an acceptable level of light/wash fastness and crock characteristics.

The polyolefin in these compositions and processes preferably is isotactic polypropylene. In the processes, the composition may be a blend or one in which at least a portion of the ethylene copolymer is grafted onto said polyolefin. The ethylene copolymer in the compositions include ethylene methyl acrylate, ethylene ethyl acrylate, and ethylene butyl acrylate.

It is an object of the present invention to provide an improved inert hydrophobic polyolefin-containing composition with desired dyeability and wettability characteristics. It is a further object of the present invention to provide an improved polyolefin-containing web comprised of fibers, or a nonwoven or fibrillated film suitable as cover stock for various sanitary products. Still another object is to obtain and retain high hydrophilicity and liquid strike-through properties in a strong, wellbonded, nonwoven hydrophobic material, including continuous and/or staple fibers utilizing polyolefin components.

It is a significant feature of this invention that the polypropylene-based material may be used to form fibers having applications for either woven materials or nonwoven materials, and that the fibers are spinnable at commercially acceptable rates. Yet another feature of the invention is that a polypropylene-based material may be efficiently modified to form a material having a wettability contact angle of less than about 80°.

An advantage of the invention is that the wettable polyolefin material according to this invention is more easily dyeable than prior art polyolefin fiber materials. These and further objects, features, and advantages of the present invention will become apparent from the following detailed description.

DETAILED DESCRIPTION OF THE INVENTION

Polyolefins usable in accordance with this process are crystalline polyethylene, polypropylene, or copolymers thereof having melt indices in the range of from about 0.1 to about 80 g/10 min. The most important polyolefin for use in formation of fibers at this time is isotactic polypropylene, which is commercially available from many sources. The polypropylene can contain the usual thermal, oxidative, and ultraviolet light stabilizers.

The fiber-forming composition may comprise polypropylene and a copolymer of ethylene and an alkyl acrylate having 2 to 30% by weight, suitably 2 to 15%, preferably 4 to 10%, most preferably about 7%. Alternatively, and in accordance with this invention, the copolymer of ethylene and an alkyl acrylate is grafted onto the polypropylene, and the composition may include both grafted and blended ethylene alkyl acrylate copolymer. An advantage of the ethylene alkyl acrylate copolymer is that it is both thermoplastic and compatible with polypropylene so that processing difficulties are minimized or prevented. By the term "compatible" is meant that the copolymer does not separate into discrete particles in the polypropylene composition that are observable under an optical microscope at a magnification of times 250–500. The grafted version of polypropylene offers an excellent bridge for adhering with the polyester or copolyester.

The ethylene copolymer comprising ethylene and an alkyl acrylate in the compositions used in this invention include ethylene methyl acrylate, ethylene ethyl acrylate, and ethylene butyl acrylate. Ethylene methyl acrylate copolymer ("EMA") alone or in blends has been used in film, extrusion coating, sheet, molding, tubing, profile extrusion, and coextrusion areas. Compared to low density polyethylene homopolymer, it has a lower softening temperature (138° F.), a reduced flexural modulus, and improved environmental stress crack resistance. Ethylene copolymer has been disclosed for use as a blending component with low density polyethylene, polypropylene, polyester, and polycarbonate to improve impact strength and toughness, increase heat seal response and promote adhesion, reduce stiffness, and increase the surface coefficient of friction. *Modern Plastics*, Mid-October Encyclopedia Issue, 1991, pp. 71–72.

Ethylene ethyl acrylate copolymer ("EEA") resins are tough, flexible copolymers that have found application in hoses and tubings, gasketing, disposable examination gloves, and balloons. EEA has also been used for hot melt adhesives. As the ethylacrylate content of EEA increases, the copolymers become more flexible, tougher, and more resilient. The polarity of high ethylacrylate resins may enhance surface acceptance of inks and provide adhesive properties. Ethylene butyl acrylate ("EBA") is used for low melt-index films. It produces a tough film at low temperatures and is employed mainly in the packaging of frozen foods.

Particularly preferred copolymers are the ethylene methyl acrylate random copolymers of ethylene and methylacrylate and the ethylene ethyl acrylate random copolymers of ethylene and ethylacrylate. The EMA copolymers preferably contain about 20 to 24%, and preferably about 20%, by weight methylacrylate. The EEA copolymers preferably contain about 15 to 30% by weight of the ethylacrylate moiety. These copolymers have a melt index of 1 to 20, preferably about 18, and have a thermal stability such that when the temperature is raised at 10° C./min., under flowing nitrogen, less than 0.75% of the copolymer weight is lost at 300° C.

It is a critical feature of the present invention that the amount of alkyl acrylate in the polypropylene ethylene alkyl acrylate copolymer be present in an amount between 0.2 to 3.0% by weight, and preferably between 0.5 and 2.4% by weight, in order to produce a textile fiber having commercially acceptable processing characteristics. If the amount of alkyl acrylate component is increased above 3.0%, a textile fiber produced therefrom loses its necessary polypropylene characteristics, degrades during high-speed fiber processing, and produces a final fiber with unacceptably low tenacity (less than about 1.5 g/denier) and excessive elongation and with significantly different melt characteristics to be commercially unacceptable. For example, carpet made from fibers having an alkyl acrylate component between 3.0 and 5.0% melts excessively upon exposure to flame as compared to conventional polypropylene carpet to the point that it dramatically fails a standard "pill test" for flame resistance while standard polypropylene passes. Further, at an alkyl acrylate content above 2.4%, the fiber fuses together on the heated drawing rolls and is basically unspinnable on modern commercial scale equipment. These subtle, yet commercially critical, limitations were complete unexpected.

An alkyl acrylate component of less than 0.2% produces a fiber with insufficient polarity performance character to impart a desired dyeability to accept a desired even, deep color. Accordingly, the maximum amount of alkyl acrylate component is preferred, subject to acceptable fiber production and performance character. The more preferred alkyl acrylate component is between 0.5 to 2.4% by weight, with 1.0 to 1.5% being most preferred for possible bridges/compatibility to polyesters. Polypropylene without the grafting process does not form continuous or bulk-continuous filaments with polyester or copolyester. The degree of compatibilization to enhance the processability can be augmented by incorporating the hydrophilic modifier comprising a monoglyceride and a long chain hydrocarbon with a hydrophilic group.

It is understood that polymer additives, such as thermal, oxidative, and ultraviolet light stabilizers, which are typically found in fiber-forming polymer compositions, may be added without departing form the present invention. The percent by weight values given in this application are expressed as a percent by weight of the composition, which includes polypropylene and alkyl acrylate copolymer, and preferably polyester and a hydrophilic modifier. Additives are commonly included in a polypropylene/copolymer composition to dilute the polymer composition. If such additives are included in the composition to dilute the polymer composition, the percent values must be adjusted accordingly.

The ethylene copolymers utilized in the present invention contain at least 70% ethylene, with the alkyl acrylate component present between 2 to 30%, typically between 10 to 24%, depending upon the selected alkyl acrylate. Depending upon the amount of alkyl acrylate component present in the ethylene copolymer, the ratio of ethylene copolymer to polypropylene can be easily adjusted to maintain the proper amount of alkyl acrylate in the final product. It is also important that the amount of ethylene contributed by the ethylene copolymer be maintained below 10%. Accordingly, it is preferred that the higher the percentage of alkyl acrylate in the copolymer, the easier it is to obtain the proper balance of components. By way of example, a mixture of 93% polypropylene and 7% ethylene methyl acrylate having a 20% methyl acrylate component produces a polypropylene/ethylene methyl acrylate copolymer composition having a methyl acrylate component of about 1.4%. Similarly, a 3% addition of the same ethylene methyl acrylate copolymer produces a methyl acrylate component of 0.6%.

In using a composition of the polypropylene and ethylene alkyl acrylate copolymer with polyester/copolyester and/or hydrophilic modifier, it is important that the polypropylene and ethylene alkyl acrylate copolymer be uniformly incorporated prior to forming the composition into a shaped article. The combination may be only a uniform blend, but preferably, and in accordance with this invention, it is a composition in which at least a portion of the ethylene alkyl acrylate is grafted onto the polypropylene. Blending and/or grafting can be accomplished in a separate step prior to forming, or the blending and/or grafting and extrusion can be carried out in the same operation if the extruder has a suitable mixing section. Poor blending and/or grafting can result in uneven dyeing even if the remaining steps of dyeing procedure are properly conducted.

The grafting of ethylene alkyl acrylate copolymer to polyolefin polymer, preferably isotactic polypropylene, for use in this invention is accomplished by subjecting the ethylene alkyl acrylate copolymer to co-graft polymerization in the presence of the polyolefin polymer. The graft polymerization method is not critical and the graft polymerization can be effected according to conventional methods employing organic free radical initiators. The polymerization conditions may be those known to the art. The organic radical-generating agent used in this invention includes:

2,5-dimethyl-2,5-di(t-butylperoxy)hexene-3,
2,5-dimethyl-2,5-di(t-butylperoxy)hexane,
1,3-bis(t-butylperoxyisopropyl)benzene,
2,2-bis(t-butylperoxy)-p-diisopropylbenzene,
dicumyl peroxide,
di-t-butyl peroxide,t-butyl benzoate,
1,1-bis(t-butylperoxy)-3,3,5-trimethylcyclohexane,
2,4-dichlorobenzoyl peroxide,
benzoyl peroxide,
azobisisobutyronitrile, and the like.

Preferred are:

2,5-dimethyl-2,5-di(t-butylperoxy)hexene-3,
1,3-bis(t-butylperoxyisopropyl)benzene, and
2,2-bis(t-butylperoxy)-p-diisopropylbenzene.

The thermoplastic resin composition of this invention can be obtained by adding 0.01 to 0.3 parts by weight, preferably 0.05 to 0.2 parts by weight, of an organic radical-generating agent to 100 parts by weight of a mixture consisting of 99 to 85% by weight, preferably 96 to 90% by weight, of polypropylene, and 2 to 13% by weight, preferably 4 to 10% by weight, of an ethylene alkyl acrylate copolymer, and then subjecting the resulting mixture to thermal treatment in a mixer (e.g., a Banbury mixer, a kneader) or an extruder at 170° to 300° C., preferably 180° to 250° C., for 0.2 to 30 minutes, preferably 0.5 to 20 minutes. Fiber grade polyester may subsequently be introduced up to 15% by weight, preferably about 3 to 5% by weight, of the entire matrix, in which case the polypropylene percent would be decreased by the weight percent of added polyester.

When polyester is not incorporated into the matrix, the composition comprises about 99 to 85% by weight polyolefin, preferably polypropylene, and about 1 to 13% by weight the polar group material, preferably EMA. The alkyl acrylate in the composition is about 3% by weight or less, and the maximum amount of ethylene is about 10% by weight. If maleic anhydride or acrylic acid is substituted for EMA as the polar group material, its weight percent will be less than the weight percent of EMA. If a hydrophilic modifier as discussed above is utilized in the composition, it has a maximum contribution of 2% by weight to the overall matrix.

When polyester is incorporated into the composition, the amount of polar group material and hydrophilic modifier need not change. The added 0.1 to 15% by weight polyester to the total composition will thus decrease the range of polyolefin to about 99 to 70% by weight. In the matrix of only polyolefin and polyester, the polyolefin comprises from 99.9 to 82% by weight, and the polyester comprises 0.1 to 18% by weight.

The uniform combination of polypropylene and ethylene-alkyl acrylate copolymer is formed into the desired shaped article by any of the known techniques, such as melt spinning in the case of fibers, casting, or other known methods of filmmaking, extrusion, or injection molding. The present invention is particularly useful with fibers, and fibers of various deniers can be adequately wetted both in the form of fibers or nonwoven webs made from these fibers. When a degree of orientation is increased, at a given melt flow rate, for example, by a times 3 compared to a times 1.5 draw ratio, a significant increase in uptake of the dyestuff is observed. An increased degree of orientation is the result of the degree of higher draw ratios. Generally, the fibers are from 1 to 1500 denier and can be in the form of round or lobed fibers, tape, or fibrillated film. Round or lobed fibers are for apparel, upholstery, and carpet face yarn uses and can have a denier of about 1 to 60 without encountering dyeing problems by the present technique. These fibers can also be used in production of other articles, such as decorated ribbons or nonwoven textiles. The tape fibers are generally used for carpet backing and are of heavier denier, i.e., about 500 to 1500 denier. Fibrillated film fibers are used to cordage carpet face yarn or upholstery.

Sizing is a procedure by which warp yarn is prepared for weaving by coating it with a sizing agent, such as PVA. In effect, sizing reduces the metal-to-fiber friction, thereby protecting the yarn from abrasion. It is important for the yarn to be sized so that it perform well on the weaving machines without being abraded and cause processing problems.

Through use of the AATCC test method for shrinkage from home laundering, it was determined that this modified polypropylene fiber had similar shrinkage characteristics as regular polypropylene. A vertical flammability test commonly used in the textile industry was also performed on this modified polypropylene fiber. There was no significant difference between flammability test results for this fiber and for conventional polypropylene fibers.

For fibers to be fully penetrated by dye, the spinning and drawing processes should be conducted in a manner to produce a fiber with a uniform structure through its cross-section, i.e., minimal sheath/core structural differences. On the other hand, greater economy of dye used in dyeable carpet backing made from woven tapes can be obtained if such tapes do possess a sheath/core structure. In these sheath/core structures, the sheath is dyeable, while the core exhibits very little dye pick-up. Thus, less dye is used to dye a backing that is made up from such fibers.

After spinning of the fibers, but before drawing, a spin finish can be applied to the fibers. If such a material is used, it may be anionic, but preferably is nonionic in nature. Nonionic spin finishes are commercially available, and a preferred one is Dispersol VL. Suitably usable is Nopcostat 2152P, which is thought to be a modified coconut fatty acid ester. Finishes containing mineral oil act as a plasticizer and can increase dye uptake rate at the fiber surface. A water-dispersible or water-soluble finish such as Dispersol VL is preferred. Finishing operations can optionally be performed on the fibers before dyeing. For example, the fibers can be texturized by mechanically crimping or forming, such as described in *Textile Fibers, Dyes, Finishes, and Processes: A Concise Guide*, Howard L. Needles, Noyes Publications, 1986, pp. 17–20.

This invention specifically deals with the synergistic phenomena among polypropylene, polyester or copolyester, ethylene methyl acrylate (or maleic anhydride or acrylic acid), and preferably a hydrophilic modifier comprising a monoglyceride and a salt of a linear alkyl. Polyolefin-type polymers are the most challenging fibers to wet using conventional fiber production techniques. Polypropylene practically is a nonpolar polyolefin polymer with a very low surface energy. It has been reported that the surface energy of polypropylene is a 28.7 dynes/cm with 26.0 and 2.7 dynes/cm dispersive and polar fractions, respectively.

Polypropylene can be modified with EMA at a certain level to enable the polyolefin fibers to be reliably dyed with disperse dyes. However, the introduction of polar groups does not impart any "wettable" characteristics. Similarly, both acrylic acid and maleic anhydride modified products also do not yield a wettable polymer or fiber. Commercial materials, such as the Polybond™ material from Uniroyal Chemical Company, Inc., combine functional monomers such as acrylic acid or maleic anhydride with polyolefin, and thereby form chemically grafted polyolefin copolymers. This chemically grafted polyolefin copolymer, when combined with polypropylene, similarly does not produce a wettable fiber.

Hydrophilic modifiers, including long chain hydrocarbons with a hydrophilic group, when incorporated into a polyolefins matrix, also do not offer any appreciable wettability. However, when a preferred hydrophilic modifier such as disclosed herein is used in conjunction with polar substrates, such as EMA or Polybond™, the wettability of the polyolefin improves dramatically, as measured by contact angle.

A preferred modifier is a combination of nonionic and anionic structures. The nonionic structure may be a monoglyceride with a melting point of approximately 66° C. and a boiling point of approximately 260° C. Glycerol monosterate ("GMS") is the presently preferred monoglyceride. This nonionic structure is highly distilled, with a monoglyceride content in excess of 95% by weight. The minor component has an anionic structure and is a potassium salt linear alkyl ($C_{16}$ to $C_8$) phosphate. The preferred ratio of these two components varies depending on the application, although the nonionic structure preferably is from 50 to 90% by weight of the modifier. A 80:20 ratio by weight of the nonionic and anionic structure is preferred. Other preferred hydrophilic modifiers are polypropylene glycol polyoxyethylates and fatty alcohol polyoxyethylates. Other hydrophilic modifiers may include alkyl phenol polyoxyethylates, fatty acid polyoxyethylates, and fatty acid amide polyoxyethylates.

A suitable hydrophilic modifier consists of a compound including a monoglyceride and a long chain hydrocarbon with a hydrophilic group, e.g., a potassium or sodium salt of a linear alkyl phosphate. A preferred monoglyceride is glycerol monosterate. While a hydrocarbon group containing from 12 to 22 carbon atoms may be used, a $C_4$ to $C_8$ hydrocarbon chain length is preferred. Typical hydrophilic groups are the carboxylates, sulfates, sulfonates, phosphates, and phosphonates, "Quaternary ammonium salts and polyoxyethylene groups may also serve as a suitable hydrophilic group. " The adsorption of these compounds is caused by putting the long chain hydrocarbons on a polyolefin backbone.

A preferred hydrophilic modifier is Product No. 5808, available from G.R. Goulston and Company in Monroe, N.C. This compound (hereafter "5808 Modifier) consists of a mixture of a food grade emulsifier, such as mono and diglycerides of edible fats and oils, and a salt of a linear alkyl phosphate. The raw material for the long chain hydrocarbon group may be an oil or fat (e.g., fatty acids, fatty alcohols, or their derivatives), or a petroleum or petrochemical (e.g., n-paraffin, naphthenic acid, x-olefin, alkyl benzene, alkyl phenol, synthetic alcohol, synthetic fatty acid, polyoxyalkylene glycol, or polysiloxanes). The hydrophilic group may be anionic (e.g., carboxylate, sulfonate, sulfate, phosphate, or phosphonate), cationic (e.g., amine salts, quaternary ammonium salts, pyrridium salts, sulfonium salts, phosphonium salts, amino acid, amino sulfate, betaine, or sulfobetaine), or nonionic (e.g., polyhydric alcohol, glycerine, glucose, sorbitol, sucrose, aminoalcohol, polyethylene glycol, amineoxide, sulfoxide, or amineimide).

The hydrophilic group alone, though polar in nature, does not migrate very well to the surface. Since the wettability characteristic is generally regarded as a surface phenomenon, it is important that these components be present at the surface rather than in the bulk region. The push to migrate or exude towards the surface comes from the highly distilled (>90%) monoglyceride, which by itself does not impart the surface wettability. Accordingly, it is beneficial to melt/fuse the monoglyceride with the long chain hydrocarbons having the hydrophilic group component so as to realize the significant impact on surface wettability. This melt/fuse operation may be performed by a prilling process or a pastillizing process so that heat transfer takes place in a manner that will not degrade the monoglyceride. Due to surface grafting of polyolefins with the polar material, the additional increase in surface energy imparts the wettability that is necessary for applications involving fibers, fabric, sheet, and film.

There is a remarkable difference in polarity between the long chain hydrocarbon molecules and the hydrophilic group. According to this invention, wettability is enhanced without sacrificing any inherent characteristics of polyolefins, e.g., moisture and stain resistance. As discussed above, polypropylene is practically a nonpolar polymer where the surface energy contribution is derived from the dispersive forces (almost up to 90%) and a very low (10%) level of polar forces. While polarity is introduced through the grafting process, wettability is not substantially increased, as evidenced by the contact angle measurement. When the selected hydrophilic modifier is incorporated with the polar material, a synergistic effect is demonstrated by achieving not only a low contact angle, but also an increase in spreading factor values.

After conventional finishing, the fibers may then be dyed in a disperse dye bath generally between pH 2 and pH 6, suitably between pH 4 and pH 6, using conventional disperse dyes and disperse dyeing techniques. Disperse dyes are sparingly soluble in water, and the aid of a surfactant to disperse the dye in the dye bath is preferable. When dyeing additive-modified polyolefin alone in the dye bath, the surfactant can be omitted. For best results and for good dye penetration, a nonionic surfactant (0.1 to 100 ppm of dyeliquor) can be optionally employed.

Physical factors such as temperature, agitation, and auxiliary chemicals added to the dye bath can alter the rate of dyeing and/or the total dye absorbed by the fiber. Agitation of the dye bath speeds dye diffusion to the fiber in the dye bath. The rate of dye passage across the fiber-liquid interface is rapid in most cases, so the rate of dyeing is essentially determined by the rate of dye movement within the fiber matrix.

Olefin polymers do not disperse particularly well in linear polyester or copolyester. While an olefin component in theory might be incorporated into the polyester at the polymerization stage, this would be highly disadvantageous because of the requirement to provide an injection facility for the added olefin or polyolefin component. Moreover, polypropylene will degrade dramatically during the polyester polymerization process. If the polyester were added during the polymerization of polyolefin, the entire process would be poisoned due to polar moiety.

The dispersibility of linear polyester into the olefinic polymers can be significantly improved by the incorporation of a polar group material, e.g., EMA, which can be enhanced further by a hydrophilic modifier. The linear polyester may be produced by condensing one or more dicarboxylic acids or a lower alkyl diester (e.g., terephthalic acid, isophthalic acid, phthalic acid, 2,5; 2,6-; or 2,7-naphthalene dicarboxylic acid, succinic acid, sebaccic acid, adipic acid, azelaic acid, bibenzoic acid, and hexahydroterephthalic acid or bis-p-carboxyphenoxyethane) with one or more glycols (e.g., ethylene glycol, 1,3-propanediol, 1,4-butadediol, neopentyl glycol, and 1,4-cyclohexanedimethanol). The preferred polyester is polyethylene terephthalate, and a fiber grade polyester will have an intrinsic viscosity of about 0.64.

The polyester may be a copolymer containing a mixed hydroxylic acid and/or ester forming acidic groups and may be a block copolymer formed from different polyesters. The copolyester may contain polymeric segments having a glass-transition temperature of less than 0° C. so that the polyester is internally plasticized. The polymer used for the polymeric segment should be capable of undergoing polycondensation with the segments of the polyester through reactive end groups, and as hydroxyl or carboxyl groups, or being linked to polyester segments. Suitable polymeric segments are polyethylene glycol and polytetramethylene glycol, with the polyester segment typically being polyethylene terephthalate or polybutyl terephthalate.

This invention thus reduces or eliminates the drawbacks due to poor dispersability of a polyolefin resin and a polyester resin in each other. A composition and process capable of providing continuous filaments or fibers is disclosed that significantly improves the dyeability of a polyolefin composition.

As known in the art, various specialized techniques have been developed for application of disperse dyes to fibers. Unless the dyeing is carried out at 100° C. or above, the rate of dyeing is slow. Dyeing with disperse dyes from aqueous solutions at 120°–130° C. to achieve rapid dyeings requires the use of closed high-pressure equipment. Jet dyeing has been introduced that permits high-temperature dyeing and impingement of the dye onto the moving fabric through use of a venturi jet system. Carriers permit faster dyeing at atmospheric pressure and below 100° C. Carriers are usually organic compounds that can be emulsified in water and that have affinity for the fiber polymer. The carriers penetrate the polymer, often swelling the fiber, and aid passage of the disperse dye across the dye solution fiber interface into the fiber. Suitable carriers include aromatic hydrocarbons such as diphenyl and methylnaphthalene, phenolics such as o- and p-phenylphenol, halogenated aromatics such as the di- and trichloro-benzenes, aromatic esters including methyl salicylate, butyl benzoate, diethylphthalate, and benzaldehydes. Carriers must be removed after dyeing.

A preferred swelling agent is of the type disclosed in U.S. Pat. No. 5,358,537 to Shaw Industries, Inc. A polypropylene-based compound as disclosed herein accordingly may also include a swelling agent, such as n-cyclohexyl-2-pyrrolidone, diethylene glycol, or n-octyl-2-pyrrolidone. A mixture of n-cyclohexyl-2-pyrrolidone and diethylene glycol may be preferred. The mixture may also include an amphoteric agent, such as Wacogen NH600N, Chemcogen 132-N, or combinations thereof to act as a wetting agent or dye compatibilizer, thereby significantly enhancing dying characteristics. For space dying and printing applications, the dye mixture preferably is in the form of a paste to allow for the selective placement of the mixture on the yarn, fabric, or carpet. For such applications, the viscosity of the mixture may be adjusted from about 800 to about 3,000 centipoise (at 80° F. as measured by the Brookfield Viscosimeter with a No. 3 spindle). A selected thickener from group consisting of guar gum, gum arabic, modified cellulose, locust bean gum, xanthene gum and combinations thereof may be used to obtain the desired viscosity. A dye mixture comprising a disperse dye and the additives such as described above may be applied to the polypropylene fibers. A dry heat may then be applied to the fibers and the dye mixture at a temperature of from 95° C. to about 110° C. for time sufficient to effect dispersion of at least a portion of the disperse dye into the polypropylene fibers. Generally from 1 minute to 10 minutes of exposure to dry heat should achieve the desired dispersion. The residual dye is then removed from the fibers.

A disperse dye mixture may thus be applied to the polypropylene fibers in various ways. The dye mixture may be applied intermittently along the length of yarn formed from fibers using various well known techniques to create a desired effect. One suitable method of dying fibers may be referred to as the "knit-deknit" dying technique. According to this method, the fibers are formed into a yarn which in turn is knit, typically into a tubing configuration. The dye mixture is then intermittently applied to the knit tubing. After dying, the tubing is unraveled and the yarn thus has an intermittent pattern. According to an alternative printing method, the fibers are first formed into yarn which is then woven or knitted into fabric, or is tufted into the carpet. A conventional flat screen printing machine, such as sold by Peter Zimmer, Inc., may be used for applying the dye mixture to the fabric or carpet.

Continuous dyeing is carried out on a dyeing range where fabric or carpet is continuously passed through a dye solution of sufficient length to achieve initial dye penetration. Some disperse dyes may be sublimated under heat and partial vacuum into polymer fiber by methods known in the art. Printing of polyolefin compositions made in accordance with our invention can be accomplished with disperse dyes by heat transfer printing under pressure with sufficient heating to cause diffusion of disperse dyes into the polyolefin. Block, flat screen, and heat transfer batch processes, and engraved roller and rotary screen printing continuous processes may be used. Different dye solutions may be jet-sprayed in programmed sequence onto fabric or carpet made of the compositions of this invention as the fabric passes under the jets to form patterns. Dye solution may be metered and broken or cut into a pattern of drops that are allowed to drop on a dyed carpet passing underneath to give a diffuse overdyed pattern on the carpet. Competitive dyeing of polyolefins is useful when dyeing styled carpets consisting of several different fibers such as nylon, polyester, etc., and a polyolefin. Different styling effects can be produced by controlling shade depth on each type of fiber present. Acid, disperse and premetallized dyes, or combinations thereof, depending upon the fibers present, can be employed to obtain styling effects. Also, styling effects obtained from a fiber combination can be achieved by making a fabric or carpet face from polyolefin yarns containing varying amounts of ethylene alkyl acrylate copolymer. Just as tweed effects can be produced in a nylon carpet by tufting with nylon fibers containing different levels of amine ends, so too can these styled, tweed effects be produced in a polyolefin fiber by controlling the concentration of ethylene alkylacrylate dye sites. Print dyeing, space dyeing, and continuous dyeing can be carried out with fabrics made from such yarns.

There are many commercially available disperse dyes. Dyes are classified based on method of application and, to a lesser extent, on chemical constitution by the Society of Dyers and Colorists. Various disperse dyes may be found in the listing "Dyes and Pigments by Color Index and Generic Names" set forth in *Textile Chemist and Colorist*, July 1992, Vol. 24, No. 7, a publication of the American Association of Textile Chemists and Colorists.

Dyes are intensely colored substances used for the coloration of various substrators, such as paper, plastics, or textile materials. Dyes are retained in these substrates by physical adsorption, by salt or metal-complex formation, or by the formation of covalent chemical bonds. The methods used for the application of dyes to the substrate differ widely, depending upon the substrate and class of dye. It is by applications methods, rather than by chemical constitutions, that dyes are differentiated from pigments. During the application process, dyes lose their crystal structures by dissolution or vaporization. The crystal structures may in some cases be regained during a later stage of the dyeing process. Pigments, on the other hand, retain their crystal or particulate form throughout the entire application procedure.

A large number of dyes, with widely differing properties, are therefore necessary because of the great variety of materials to be dyed. On a worldwide basis, it is believed that over 8000 chemically different dyes have achieved commercial significance. To assist both the dye users and dye manufacturers, dyes are therefore classified into groups two ways. The first method of classification is by chemical constitution in which the dyes are grouped according to the chromophore or colorgiving unit of the molecule. The second method is based on the application class of end-use of the dye. The dual classification system used in the color index (CI) is accepted internationally throughout the dye-manufacturing and dye-using industries. In this system, dyes are grouped according to chemical class with a CI number for each chemical compound and according to usage or application class with a CI name for each dye. Disperse dyes are generally water-insoluble nonionic dyes typically used for dyeing hydrophilic fibers from aqueous dispersion. Disperse dyes have been used on polyester, nylon, and acetate fibers.

The invention can be further understood by referring to the following examples in which parts and percentages are by weight unless otherwise indicated.

EXAMPLE 1

A polypropylene alloy composition containing 82.5% by weight of a commercial fiber grade of is,tactic polypropylene having a melt flow rate of 18 (ASTM D-1238-89, 230° C., 2.16 lbs) and containing thermal, oxidative, and ultraviolet light stabilizers and 7% by weight of a copolymer of ethylene methylacrylate along with 5808 Modifier (0.5% by weight) was prepared by first dry mixing the polymers and then melt blending the mix in a 40 mm Berstorff extruder at 246° C. The ethylene copolymer contained 20% by weight of the methylacrylate comonomer and had a melt index of 18 (ASTM D-1238-89, 190° C., 2.16 lbs). The fiber grade polyester was blended in at 10% of the total matrix. The resulting homogeneous, compatible polymer blend was cut into nibs after water-quenching, which were then fed to a melt spinning apparatus, and 50–60 denier per filament fiber was spun at 260–265° C. A mineral-oil-based finish containing anionic surfactants was applied to the fiber bundle after spinning, but before drawing. The fibers were drawn times three to give a final denier of 18–20 per filament. The physical properties of specimens of the fibers so prepared were tested, and the test results are set forth in Table I. Specimens of the fibers were knitted on a knitting machine to produce a tubular knit fabric. Samples of the fibers were also tested for wetting characteristics.

EXAMPLE 2

A polypropylene graft composition containing 82.5% by weight of a commercial fiber grade of isotactic polypropylene having a melt flow rate of 4 (ASTM D-1238-89, 230° C., 2.16 lbs) and 7% by weight of a grafted copolymer of ethylene methylacrylate (and containing thermal, oxidative, and ultraviolet light stabilizers) was prepared by first dry mixing the polymers along with 0.5% by weight of the 5808 Modifier. This mixture was combined with the fiber grade copolyester at 10% by weight of the total matrix. The resulting mixture was melt blended in a 40 mm Berstorff extruder at 246° C. in the presence of sufficient free radical initiator peroxide, specifically, 2,5-dimethyl-2,5-di(tertiary-butyl peroxy)hexane, to visbreak the composition to a product melt flow rate of 18. The ethylene copolymer contained 20% by weight of the methylacrylate comonomer and had a melt index of 18 (ASTM D-1238-89, 190° C., 2.16 lbs). The resulting homogeneous, compatible polymer blend was cut into nibs after water-quenching, which were then fed to a melt spinning apparatus, and 50–60 denier per filament fiber was spun at 260–265° C. A mineral-oil-based finish containing anionic surfactants was applied to the fiber bundle after spinning, but before drawing. The fibers were drawn times three to give a final denier of 18–20 per filament. The physical properties of specimens of the fibers so prepared were tested, and the test results are set forth in Table I. Specimens of the fibers were knitted on a knitting machine to produce a tubular knit fabric. Samples of the fabric were also tested for wetting characteristics.

TABLE I

| Physical Properties | (Unmodified homopolymer) | Example I (Alloy Modified PP) | Example II (Grafted Modified PP) |
| --- | --- | --- | --- |
| Denier (gms/9000 meters) | 1,450 | 1,500 | 1,470 |
| Tensile (gms/den) | 2.5 | 2.0 | 2.2 |
| Elongation (%) | 39.0 | 65.0 | 70.0 |

EXAMPLE 3

A polypropylene combination alloy and graft composition containing 82.5% by weight of a commercial fiber grade of isotactic polypropylene having a melt index in the range of 8–12 (ASTM D-1238-89, 230° C., 2.16 lbs) (and containing thermal, oxidative, and ultraviolet light stabilizers) and 7% by weight of an alloyed and grafted copolymer of ethylene methylacrylate was prepared by first dry mixing the polymers along with a 5808 Modifier (0.5% by weight), and then melt blending the mix with fiber grade copolyester at 10% of the total matrix in a 40 mm Berstorff extruder at 246° C. in the presence of sufficient free radical initiator peroxide, specifically 2,5-dimethyl-2,5-di(tertiary-butyl peroxy)hexane, to visbreak the composition to a product melt flow rate of 18. The ethylene copolymer contains 20% by weight of the methylacrylate comonomer and had a melt index of 18 (ASTM D-1238-89, 190° C., 2.16 lbs). The resulting homogeneous, compatible polymer blend was cut into ribs after water-quenching, which were then fed to a melt spinning apparatus, and 50 to 60 denier per filament fiber was spun at 260° to 265° C. A mineral-oil-based finish containing anionic surfactants was applied to the fiber bundle after spinning, but before drawing. The fibers were drawn times three to give a final denier of 18 to 20 per filament. The physical properties of specimens of the fibers so prepared were tested, and the test results were about the same as those obtained with the fibers of Example 2. Specimens of the fibers were knitted on a knitting machine to produce a tubular knit fabric. Samples of the fibers were also tested for dyeing and wetting characteristics, according to the procedure given below.

Dye procedure steps involving a scour, dye, and reduction clearing operation were used, as explained hereafter. In the scour step, the sample was rinsed in cold water for 5 minutes and the bath changed. The sample was introduced in a new bath of 0.5 g/l Keirlon TX-199 wetting agent/detergent and 0.25 g/l of soda ash, then heated to 160° F. and held for 10 minutes. After cooling to 100° F., the sample was rinsed.

In the dye step, the dye bath was prepared as follows: 1% dye, 1% Triton X-100 (surfactant), 1% Synthrapal LFP (disperse leveling agent). The pH was brought to 5.5 with acetic acid and the bath heated to 120° C. at 2.5° C. per minute. The bath was held at that temperature for 30 minutes, then cooled to 40° C. at 3° C. per minute. The sample was rinsed warm, extracted, and dried. Optionally, for good fastness properties an additional step, namely, reductive clearing/stripping, may be carried out as follows.

In the reduction clearing step, wash dyed samples are placed in a series of tanks: first tank, wet out with Triton X-100; second, third, and fourth tanks, reductive clearing at 70° C. with 8 g/l of sodium hydroxide at 32% concentration, 4 g/l sodium hydrosulfite for a total of 30 seconds. Rinse occurs in the fifth tank, and the sample is neutralized with acetic acid in the sixth tank. This process of reductive clearing ensures the removal of surface adhered dyes and in general produces better fastness results.

While the prior art teaches the existence of polypropylene incorporated (by grafting or blending) with ethylene-alkyl acrylate copolymers, the above examples illustrate that, in only certain limited amounts, a particular ethylene copolymer with a proper combination with polyester and hydrophilic modifier has the surprising ability of making a commercially acceptable, spinnable textile fiber of polypropylene that can accept disperse dyes sufficient to produce a deeply colored fiber with superior physical properties.

Those skilled in the fiber-making art have long believed that any acrylate additive produces a resin composition that cannot be spun at modern high-speed production without separation of the components. Further, the addition of many additives, including acrylates and acetates, imparts a disagreeable feel and smell to the finished fiber goods, partially as a result of degradation during the spinning and drawing process. Fiber manufacture typically imparts terrific shear forces to a polymer composition and "draw down" ratios of 20–100:1, which makes fiber-forming polymers very intolerant of many additives routinely employed in compositions having other uses. Any discontinuity or lack of uniformity in a polymer composition can result in a break when the fiber is stretched or drawn down to its final, often very thin, diameter. As a consequence, those skilled in the fiber-making art have generally not looked to compositions for other end uses as acceptable in fiber applications, particularly in areas where historical experience suggests unacceptability. The critical nature of the invention is appreciated in that a 0.2 to 3.0% by weight limitation on alkyl acrylate component in the composition, in combination with a less than about 10% by weight ethylene content attributed from the alkyl acrylate copolymer, is required to produce the desired results sufficient to achieve commercial acceptability. The hydrophilic modifier provides additional compatibilization to bridge polyester with polypropylene.

Regarding one preferred embodiment of the invention, the ethylene copolymer is incorporated into the polypropylene to form an alloy. This incorporation may take the form of either grafting or physical blending.

Those skilled in the fiber-making art have recognized that polypropylene/EVA compositions cannot produce a spinnable fiber under modern fiber-making conditions, but instead this composition very quickly degrades to produce noxious amounts of acetic acid. No other known copolymers are believed to produce commercially acceptable dyeable fibers in combination with polypropylene.

A series of polyester samples was made as described in Example 2 and was evaluated with a series of disperse dyes according to the dye procedure described earlier. The results are set forth in Table II. Light fastness and crock fastness tests were also performed on yarns at 2–20 deniers per filament. Comparable results would be expected for both the Example 1 and Example 3 samples.

While those skilled in the fiber-making art have recognized that polyester fiber is well accepted for disperse dye applications, it was not recognized that polyester at a very minute level (approximately 0.1% by weight of the polyolefin resin matrix) creates voids that tremendously enhance the dye uptake. The processibility of this composition is also significantly improved by adding a hydrophilic modifier. Though not bound by any theory, it is believed that increased wettability due to the combined nature of polarity and hydrophilicity (the polar group material combined with monoglyceride and linear alkyl phosphate) and morphological changes caused by the addition of polyester causes the disperse dyes to diffuse into the fiber very rapidly (i.e., high exhaust) and tend to stay (i.e., increased light fastness characteristics). The above composition is much more dyeable than prior art polypropylene-based materials. It is speculated that the combination of increased dispersive and polar functions far exceeds the surface energy that is critical for adequate wetting to occur on polyolefin surfaces. Neither a polar material nor a hydrophilic modifier on its own is capable of imparting such a highly desirable characteristic that produces good spreading and therefore even dyeing. With a lesser barrier to overcome, the above material therefore is comparatively easy to dye compared to conventionally modified polypropylene materials.

Hydrogen bonding of the dyestuff molecule to the carbonyl oxygen of the ester grouping in methyl acrylate is believed to be the attachment mode of the disperse dyestuff. The disperse dyestuff exhibits excellent retention, indicating strong chemical affinity between the functionality in the ester group and dyestuff. The penetration of dye molecules is facilitated by creating a hydrophilic structure with voids created by the incorporation of polyester.

TABLE II

| Disperse Dyes (3% Concentration) | Dye Exhaustion | | | |
|---|---|---|---|---|
| | Light Fastness Xenon Arc (AATCC 16E-40 hrs.) | Crock Fastness (AATCC 8-1985) | | Exhaust/ Yield |
| | | Dry | Wet | |
| Disperse Yellow 54 | 5 | 5 | 5 | 5 |
| Disperse Yellow 86 | 5 | 4–5 | 4–5 | 5 |
| Disperse Blue 35 | 5 | 5 | 5 | 5 |
| Disperse Blue 87 | 5 | 5 | 4–5 | 5 |
| Disperse Blue 291 | 5 | 5 | 4–5 | 5 |
| Disperse Blue 60 | 5 | 4 | 4 | 5 |
| Disperse Red 60 | 5 | 4 | 4 | 5 |

TABLE II-continued

| | Dye Exhaustion | | | |
|---|---|---|---|---|
| Disperse Dyes (3% Concentration) | Light Fastness Xenon Arc (AATCC 16E-40 hrs.) | Crock Fastness (AATCC 8-1985) | | Exhaust/ Yield |
| | | Dry | Wet | |
| Disperse Orange 25 | 5 | 5 | 5 | 5 |

Fastness Rating:
5 - No Change
4 - Slight Change
3 - Noticeable Change
2 - Significant Change
1 - Severe Change
Exhaust Rating:
5 - Total Exhaust
4 - Good Exhaust
3 - Moderate Exhaust
2 - Poor Exhaust
1 - Light Staining Dye exhaust, set forth in the last column, has been used as the basis for identifying dyes suitable for the polymer. Since there are thousands of possible dyes that are known and are commercially available, it should be appreciated that relatively few dyes produce acceptable exhaustion when applied to the polypropylene-based fibers as disclosed herein. Of all the workhorse dyes that are known to exist, most disperse dyes should produce acceptable results. The most important criteria for dye selection, in contemporary times, are dye exhaust and fastness retention. It is important that the substrate in a woven, tufted, knitted, or nonwoven product readily pick up the dye from the bath and retain it, thereby reducing environmental waste and improving economic utility of the expensive dye. Hardly any differences appear to exist when these criteria are used to evaluate dye performance between 100% polyester fabric and enhanced polyolefin fabric.

Accordingly, dye exhaust or the extent to which the textile depletes a dye bath has been used as the basis for determining the dyeability of the polyolefin. Other performance properties, such as light fastness, wash fastness, and crock fastness, are more a function of many other variables, such as the conditions of dyeing, the auxiliaries used in dyeing, and, in general, the dye procedure and the after-treatment.

Consistent with the Gray Scale Grading System devised by the AATCC, a scale of 1 to 5 is used, with 5 being a near total exhaustion of the dyestuff from the dye bath to the substrate and 1 being merely a staining of the substrate, almost all dyestuff remaining in the bath. All other grades between 5 and 1, including the intermediates such as 3-4, are based upon a linear scale of dye exhaust from the bath to the substrate. While a rating of 5 would be the most preferred, for operational purposes a rating of 3-4 or above is acceptable as a standard for a polymer fiber to be considered "dyeable" with a particular dye.

To enhance the dyeability characteristic, especially with cationic dyes, several attempts were made to introduce a sulfonic group onto a polymer. A sulfonic group introduced there on a polymer should improve dyeing, especially utilizing cationic dyes instead of disperse dyes. This invention discloses a method of causing polyester which includes sulfophthalic acid to react with an olefin (or polyolefin) or with an alkyl acrylate copolymer.

Sulfopolyesters (polyesters with a sulfonic group) were made by the polycondensation reaction of the selected dicarboxylic acids (A's) and glycols (G's) to produce a linear structure shown below in a simplified form:

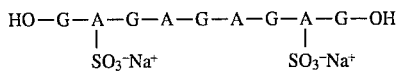

A=An aromatic dicarboxylic acid moiety
G=An aliphatic or cycloaliphatic glycol residue
—OH=Hydroxy end groups The polycondensation reaction, in which a carboxyl group (—COOH) reacts with a hydroxyl group (—OH) to from ester linkages, is carried out at high temperatures (275° C. to 290° C.) and low pressure (<1 torr) to produce number-average molecular weights in the 10,000 to 15,000 range. The thermal stability of a polymer formed under such extreme conditions is adequate for most fiber spinning process applications. Adding a sulfonic group to isophthalic acid during the polymerization process of the polyester is much easier than adding a sulfonic group to polypropylene. It may be possible, however, to produce a sulfonated hydrophilic modifier.

As indicated in the above structure, some of the aromatic dicarboxylic acid units have sodiosulfo (—SO–Na$^+$) substituents attached. The sulfopolyesters feature of this invention requires more ionic groups in order to make the entire fiber structure more acceptable to cationic dyes. The hydrophilic nature of these ionic groups also imparts improved disperse dyeability. Several basic dyes were attempted on a fiber composed of polypropylene, alkyl acrylate copolymer, and sulfopolyester with and without additional hydrophilic modifier.

Basic dyes have been used extensively for dying silk, cellulose acetate, and polyacrylonitrile (acrylic or modified acrylic) fibers. The positively charged colored ion of the basic dye, the cation, is attracted strongly by the negatively charged ions in the fiber. Fibers dyed with basic dyes usually exhibit good light and wash fastness. As a class, basic dyes have a high color value and are characterized by brilliant shades. Basic dyes are thus well suited for application to fibers composed of negatively charged polymer molecules. Since basic or ionic dyes contain positively charged ions, bonds can be easily formed between the cation of these dyes and an ionic sites in the fibers. At the conclusion of the dye cycle, the dye cations are almost completely absorbed or complete exhausted by the fiber.

Based upon this understanding, a sulfonated group was introduced to the polyester component of the polypropylene mixture by a grafting technique, as described above. Tests were conducted using basic workhorse dyes, including Basic Blue-41 and Basic Red-46. Each of these dyes, when used in conjunction with a polypropylene mixture including a sulfopolyester as described above, yielded brilliant shades on fibers. A grafting technique is preferably employed to include the sulfonated group on the polyester.

Samples of these fibers were also tested for wetting characteristics. The core of the physical phenomena expressed by known equations may be described as follows: When the adhesion between solid and liquid is less than the self-cohesion (or surface tension) of the liquid, there is a contact angle. The larger the contact angle, the smaller the adhesion. When the adhesion is equal to or greater than the cohesion, the angle is zero, and a complete wetting occurs. As a practical matter, one does not have generally satisfactory wetting, at least with respect to the wetting of polyolefin materials, if the contact angle is not less than about 80°.

Another characteristic of a polyolefin material is its spreading factor, which may be defined as the ratio of the length L of a liquid drop D on a surface S as a function of time. Accordingly, $L_0$ may be the measured length of a drop D 30 seconds after being deposited on surface S, and $L_1$ may be the length of the same drop D on surface S 5 minutes after being deposited (4.5 minutes subsequent to the time $L_0$ is measured). In this case, the spreading factor SF may be expressed as follows:

$$SF = \frac{L_1 - L_0}{L_0}$$

The spreading factor was measured by the difference in drop length relative to that of the original drop length over 5 continuous minutes. Generally, if this spreading factor is <1.0, then the resultant composition and fiber/fabric is considered not wettable. An ideal wettable polymer therefore will have both contact angle <80° and a spreading factor >1.0.

TABLE III

Wetting of Spreading Characteristics of Polyolefin-based Filaments

| Sample ID | Contact Angle | | Spreading Factor |
|---|---|---|---|
| | After 30 Seconds | After 5 Minutes | |
| Polypropylene (pp) | 105 | 100 | <<<1 |
| pp + Nonionic Modifier | 98 | 90 | <<1 |
| pp + Anionic Modifier | 96 | 90 | <<1 |
| pp + Ethylene Copolymer | 98 | 90 | <<1 |
| pp + Ethylene Copolymer + Nonionic Modifier (0.5%) | 65 | 52 | <1 |
| pp + Ethylene Copolymer + Nonionic Modifier (1%) | 45 | 38 | −1.0 |
| pp + Ethylene Copolymer + Anionic Modifier (0.5%) | 59 | 51 | >1 |
| pp + Ethylene Copolymer + Anionic Modifier (1.0%) | 62 | 51 | >1 |
| pp + Ethylene Copolymer + Polyester (1%) + Anionic Modifier (1.0%) | 60 | 40 | >>1 |
| pp + Ethylene Copolymer + Polyester (10%) + Anionic Modifier (1.0%) | 58 | 41 | >>1 |
| pp + Ethylene Copolymer + Polyester (15%) + Anionic Modifier (1.0%) | 58 | 41 | >>1 |

Based on the data summarized above, it may be concluded that it is possible to achieve the wetting of polypropylene by incorporating both the modification through grafting technique utilizing either EMA or maleic anhydride (or possibly acrylic acid) and a suitable hydrophilic modifier. Either of these by itself will not impart the wettability. The addition of polyester does not alter the wetting characteristic drastically. This polypropylene/polar group material/hydrophilic modifier material combination may be used for various applications wherein reasonable or high wettability is desired (i.e., a contact angle of less than about 80° and spreading factor >1), such as diapers, pads, filters, tea bags, or battery separators formed of woven or nonwoven fibers. The wettability and spreadability can further be enhanced by incorporating another polyamide, i.e., either nylon 6 or 66, into the above material. The addition of polyester in the above formulation not only enhances the dyeability, but also improves the feel and aesthetic, necessary for comfort in the fabric.

From the above examples, it may be understood that the addition of both polar group material and the hydrophilic modifier to a polypropylene-based material will result in a material that is hydrophilic and thus "wettable." The polar group material may be an EMA material as described above, or may be either an acrylic acid comprising about 0.1 to 2% by weight of the polypropylene, or a maleic anhydride comprising about 0.1 to 10%, and preferably 0.1 to 2%, by weight of the polypropylene. The hydrophilic modifier may be either a nonionic or anionic material and may be used in compositions wherein the hydrophilic modifier is present in the amount of between 0.1 and 2%, and preferably between 0.4 and 1.0%, of the weight of the polypropylene and polar group material. The addition of polyester thus is facilitated by this compatibilizing characteristic.

The polymers as described above thus have significantly improved hydrophilic characteristics that enable the polymers to be formed into fibers suitable for fabrics or into injection molded films. These polymers provide improved dyeability and particularly make the polymer dyeable with a broad range of disperse dyes. This increased dyeability feature is of great importance because certain disperse dye molecules are too large to diffuse into the fiber core of prior art polypropylene fibers, but these same molecules may penetrate into the improved polypropylene fibers of this invention. Dye selection therefore becomes less complex, and the final shade of the dyed product is brighter, deeper, and sharper than prior art compositions. This wettability characteristic also should provide excellent exhaustion for the dyed products since the dye molecules, once in place in a fiber, should tend to stay in place. Improved wash fastness and crock fastness results may thus be expected, and the product should be both wettable and dyeable for various applications.

A hydrophilic dyeable and wettable polymer provides highly desirable material features, such as permanency, wickability, and extra comfort. These attributes are highly desired in product applications such as diapers, adult incontinence products, and sanitary napkins, where a nonwoven web comes in contact with the body or entry point for any fluid penetration.

The utility of this composition is not limited to absorbent products as described above, and the invention has utility also in packaging and consumer goods. Tea bag pouches formed from a nonwoven web may thus be made of this polypropylene material. By having a wettable polypropylene nonwoven web, an increased immersion of tea leaves in hot or cold water is expected to result in a final product with improved aroma, taste, and efficiency. Moreover, the improved nonwoven web will not produce any significant detrimental effects, such as leaching out a component, that may affect taste.

In industrial products, nonwoven mats made out of polypropylene are increasingly used. The present invention is accordingly expected to significantly enhance the performance of mats or fabric sheets containing nonwoven fibers. For example, filter cartridges made out of polypropylene will have tremendous effect on pressure drop, since the initial resistance will be reduced and internal wicking will promote a high flow rate. The lifetime of the filter will be increased while also increasing the flow rate characteristics of the filter. From a commercialization standpoint, the "durability" feature could have numerous applications in both absorbent products and nonabsorbent products.

In addition to being used as a diaper cover stock or a filtration media, the fabric sheet including nonwoven fibers according to the present invention may be used as a carpet component and in wipes and roll towels, coated or laminated fabrics embedded in other home furnishing fabrics, surgical caps and gowns, durable papers and packaging, and interlinings and interfacings. Information regarding manufacture of nonwoven fabrics, the performance of these materials, and the market for nonwoven fabrics are disclosed in a brochure entitled *Guide To Nonwoven Fabrics* by Association of the Nonwoven Fabrics Industry.

The composition of this invention may be used for forming both a highly wettable and dyeable polyolefin, as well as a resilient polyolefin. The composition is particularly suitable for forming improved polypropylene-based polyolefin. To substantially increase acceptance of polypropylene as a suitable replacement for various applications as discussed above requires increased dyeability and increased wettability. Moreover, the polypropylene composition of this invention may be easily formed as a fiber that is spinnable and ideally may be formed into a fabric sheet including nonwoven fibers.

Polypropylene and polyester are generally not considered compatible materials for forming continuous fibers due to the significant difference in their softening and melting temperatures. The ethylene methyl acrylate acts as a compatibilizer to allow the polyester to adhere to the polypropylene. This compatibilization is enhanced by the inclusion of the hydrophilic modifier as discussed above. This modifier also enhances the processibility of the composition to form spinnable fibers and imparts a desired resiliency and softness to the fabric formed by these fibers.

While the techniques of the present invention are particularly well suited for increasing both the dyeability and the wettability characteristics of polypropylene, it should be understood that the selected polar group material, such as an ethylene copolymer including alkyl acrylate as described above, in combination with a hydrophilic modifier as described above, may be used to substantially increase the wettability characteristics of other polyolefin materials, such as polyester, nylon, and acetate, all of which may be used to form fibers. Those skilled in the art will also appreciate that fibers made of a polyolefin material as disclosed herein may be used for various woven or nonwoven applications to form either fabrics or mats. The fibers may also be combined with other common stock materials, such as pulp or paper stock, to form a desired wettable and breathable fabric or mat. As previously explained, the concept of the present invention may also be used for form materials such as fibrillated films that do not include fibers.

It is believed that the concentration of dyes should be at least 0.1% to obtain the significant benefits of the invention. There is a current trend for blends of dyes to be used that optimize different characteristics of specific dyes for maximum performance. Carpets made from disperse-dyed fibers from this polymer exhibited excellent resistance to bleaching. In a bleach test, it was found that a typical 10% solution did not produce a change in color whereas a 100% solution produced only a significant to moderate change in color. Carpet samples made from the subject polymer and disperse-dyed with select disperse dyes are strain resistant as per the carpet industry's standard Kool-Aid test. On a scale of 1 to 10, the samples scored an absolute 10, indicating no stain on tested samples. Generally speaking, dye results indicate that the grafted version of the present invention shows a slightly better performance than the blended copolymer version.

Various modifications to the modified polypropylene fibers and to the techniques described herein for forming and dyeing such fibers should be apparent from the above description of those preferred embodiments. Although the invention has thus been described in detail for these embodiments, it should be understood that this explanation is for illustration and that the invention is not limited to these embodiments. Alternative fibers and forming and dyeing techniques will thus be apparent to those skilled in the art in view of this disclosure, and such alternative fibers and techniques may be performed without departing from the spirit of the invention, which is defined by the claims.

What is claimed is:

1. A process for forming a dyed polyolefin composition, comprising:

(a) forming a composition including about 99 to 70% by weight polyolefin, 0.1 to 15% by weight polyester, a hydrophilic modifier comprising at least 50% by weight of a monoglyceride and a long chain hydrocarbon with a hydrophilic group, the hydrophilic modifier being in an amount by weight of about 0.1 to 2% of the composition, and a polar group material, the polar group material selected from a group consisting of (1) an ethylene copolymer, the ethylene copolymer comprising about 70 to 82% by weight ethylene and about 30 to 18% by weight of an alkyl acrylate wherein the alkyl has one to four carbon atoms, the alkyl acrylate present in the composition in an amount of from 0.2 to 3.0% by weight of the composition, (2) a maleic anhydride comprising about 0.1 to 10% by weight of the composition, and (3) an acrylic acid comprising about 0.1 to 2.0% by weight of the composition; and (b) exposing the composition to a dye.

2. The process of claim 1, wherein the polyester comprises from 1 to 10% by weight of the composition.

3. The process of claim 2, wherein the polyester comprises from 3 to 5% by weight of the composition.

4. The process of claim 1, wherein the hydrophilic group comprises a salt of a linear alkyl phosphate having a hydrocarbon chain length of from 14 to 18 carbons.

5. The process of claim 4, wherein the monoglyceride and the salt of a linear alkyl phosphate are fused.

6. The process of claim 1, wherein the monoglyceride is glycerol monosterate.

7. The process of claim 1, further comprising:

introducing a sulfonic group during polymerization of the polyester; and step (b) comprises exposing the composition to a cationic dye.

8. The process of claim 1, further comprising:

providing a dye mixture comprising a disperse dye and a swelling agent; and step (b) comprises subjecting the composition and the dye mixture to a temperature of from about 95° C. to about 110° C. to disperse the disperse dye into the composition.

9. The process of claim 8, wherein the swelling agent is selected from a group consisting of n-cyclohexyl-2-pyrrolidone, diethylene glycol, and n-octyl-2-pyrrolidone.

10. The process of claim 1, wherein the polar group material is an ethylene copolymer.

11. The process of claim 10, wherein the ethylene copolymer is ethylene methyl acrylate.

12. The process of claim 1, wherein the polar group material is an ethylene copolymer and the ethylene copolymer is present in an amount of from 2 to 13% by weight of the composition.

13. A polyolefin composition, comprising:

(a) about 99 to 70% by weight polyolefin;

(b) 0.1 to 15% by weight polyester;

(c) a hydrophilic modifier in an amount by weight of from 0.1 to 2% of the composition, the hydrophilic modifier comprising a monoglyceride and a long chain hydrocarbon with a hydrophilic group; and (d) a selected amount of a polar group material selected from a group consisting of (1) an ethylene copolymer comprising 70 to 82% and about 30 to 18% by weight of an alkyl acrylate wherein the alkyl acrylate has 1 to 4 carbon atoms, the alkyl acrylate being present in an amount of from 0.2 to 3.0% by weight of the composition, (2) a maleic anhydride comprising about 0.1 to 10% by weight of the composition, and (3) an acrylic acid comprising about 0.1 to 2.0% by weight of the composition.

14. The composition of claim 13, wherein the polyester comprises from 1 to 10% by weight of the composition.

15. The composition of claim 14, wherein the polar group material is ethylene copolymer and at least a portion of the ethylene copolymer is grafted onto the polyolefin.

16. The composition of claim 13, wherein the polar group material is ethylene copolymer and the alkyl acrylate is present in an amount of 0.5 to 2.4% by weight of the composition.

17. The composition of claim 13, wherein the polar group material is an ethylene copolymer and the ethylene copolymer is present in an amount of from 2 to 13% by weight of the composition.

18. The composition of claim 13, wherein the hydrophilic group comprises a salt of a linear alkyl phosphate.

19. The composition of claim 18, wherein the monoglyceride is glycerol monosterate, and the glycerol monosterate and the salt of a linear alkyl phosphate are fused.

20. A process for forming colored fibers from a polypropylene-based composition, comprising:

(a) combining polypropylene with an ethylene copolymer of about 70 to 82% by weight ethylene and about 30 to 18% by weight of an ethylene alkyl acrylate wherein the alkyl group has 1 to 4 carbon atoms to form a composition, the alkyl acrylate present in the composition in an amount of from 0.2 to 3.0% by weight of the polypropylene;

(b) adding a polyester by weight from 0.1 to 15% of the composition;

(c) extruding the composition into fibers; and (d) exposing the fibers to a dye to color the fibers.

21. The process of claim 20, further comprising:

the polypropylene being from 99 to 70% by weight of the composition; and grafting the ethylene copolymer onto the polypropylene prior to adding the polyester.

22. The process of claim 20, wherein the polyester comprises from 1 to 10% by weight of the composition.

23. The process of claim 20, further comprising:

a hydrophilic modifier comprising at least 50% by weight a monoglyceride and a long chain hydrocarbon with a hydrophilic group, the hydrophilic modifier being in an amount by weight of about 0.1 to 2% of the composition.

24. The process of claim 20, further comprising:

introducing a sulfonic group during polymerization of the polyester; and step (d) comprises exposing the fibers to a cationic dye.

25. The process of claim 20, further comprising:

providing a dye mixture comprising a disperse dye and a swelling agent; and step (d) comprises subjecting the composition and the dye mixture to a temperature of from about 95° C. to about 110° C. to disperse the disperse dye into the composition.

26. The process of claim 25, wherein the swelling agent is selected from a group consisting of n-cyclohexyl-2-pyrrolidone, diethylene glycol, and n-octyl-2-pyrrolidone.

27. The process of claim 25, wherein the fibers form yarn which is knit before being contacted by the disperse dye and deknitted after being contacted by the disperse dye.

28. The process of claim 25, further comprising:

adding a thickener selected from a group consisting of a gum and a modified cellulose to the dye mixture.

29. A polypropylene-based fiber composition, comprising:

(a) about 99 to 70% by weight polypropylene;

(b) about 0.1 to 15% by weight polyester; and (c) an ethylene copolymer comprising 70 to 82% and about 30 to 18% by weight of an alkyl acrylate wherein the alkyl acrylate has 1 to 4 carbon atoms, said alkyl acrylate being present in an amount of from 0.2 to 3.0% by weight of the composition.

30. The composition of claim 29, wherein the polyester comprises from 1 to 10% by weight of the composition.

31. The composition of claim 29, wherein at least a portion of the ethylene copolymer is grafted onto the polypropylene.

32. The composition of claim 29, wherein the alkyl acrylate is present in an amount of 0.5 to 2.4% by weight of the composition.

33. The composition of claim 29, wherein the ethylene copolymer is present in an amount of from 2 to 13% by weight of the composition.

34. The composition of claim 33, further comprising:

a hydrophilic modifier in an amount by weight of from 0.1 to 2.0% of the composition, the hydrophilic modifier comprising a monoglyceride and a long chain hydrocarbon with a hydrophilic group.

35. The composition of claim 34, wherein the hydrophilic modifier comprises a salt of a linear alkyl phosphate.

36. The composition of claim 35, wherein the monoglyceride is glycerol monosterate, and the glycerol monosterate and the salt of a linear alkyl phosphate are fused.

37. A colored polypropylene fiber, comprising:

(a) about 99 to 70% by weight polypropylene;

(b) about 0.1 to 15% by weight polyester; and (c) an ethylene copolymer comprising 70 to 80% and about 30 to 18% by weight of an alkyl acrylate wherein the alkyl acrylate has 1 to 4 carbon atoms, said alkyl acrylate being present in an amount of from 0.2 to 3.0 by weight;

(d) a hydrophilic modifier in an amount by weight of from 0.1 to 2.0%, the hydrophilic modifier comprising a monoglyceride and a long chain hydrocarbon with a hydrophilic group; and (e) an effective amount of dye to produce a colored fiber.

38. The fiber of claim 37, wherein the polyester comprises from 1 to 10% by weight.

39. The fiber of claim 37, wherein at least a portion of the ethylene copolymer is grafted onto the polypropylene.

40. The fiber of claim 37, wherein the alkyl acrylate is present in an amount of 0.5 to 2.4% by weight.

41. The fiber of claim 37, wherein the polyester includes a sulfonic group introduced during polymerization of the polyester, and the dye is a cationic dye.

42. The fiber of claim 37, wherein the hydrophilic group comprises a salt of a linear alkyl phosphate.

43. The fiber of claim 42, wherein the monoglyceride is glycerol monosterate, and the glycol monosterate and the salt of a linear alkyl phosphate are fused.

44. A process for forming a dyed polyolefin composition, comprising:

(a) forming a composition including about 99 to 70% by weight polyolefin, 0.1 to 15% by weight polyester, and a polar group material, the polar group material comprising an ethylene copolymer, the ethylene copolymer comprising about 70 to 82% by weight ethylene and about 30 to 18% by weight of an alkyl acrylate wherein the alkyl has one to four carbon atoms, the alkyl acrylate present in the composition in an amount of from 0.2 to 3.0% by weight of the composition; and (b) exposing the composition to a dye.

45. The process of claim 44, further comprising:

a hydrophilic modifier comprising at least 50% by weight a monoglyceride and a long chain hydrocarbon with a hydrophilic group.

46. The process of claim 44, wherein the polyester comprises from 1 to 10% by weight of the composition.

47. The process of claim 45, wherein the polyester comprises from 3 to 5% by weight of the composition.

48. The process of claim 47, wherein the monoglyceride is glycerol monosterate.

49. The process of claim 44, further comprising:

a hydrophilic modifier comprising at least 50% by weight a monoglyceride and a long chain hydrocarbon with a hydrophilic group, the hydrophilic modifier being in an amount by weight of about 0.1 to 2% of the composition.

50. The process of claim 49, wherein the long chain hydrocarbon with a hydrophilic group comprises alkyl phosphate having a hydrocarbon chain length of from 14 to 18 carbons.

51. The process of claim 44, further comprising:

introducing a sulfonic group during the polymerization process of the polyester; and step (b) comprises exposing the composition to a cationic dye.

52. The process of claim 44, further comprising:

providing a dye mixture comprising a disperse dye and a swelling agent; and step (b) comprises subjecting the composition and the dye mixture to a temperature of from about 95° C. to about 110° C. to disperse the disperse dye into the composition.

53. The process of claim 44, wherein the ethylene copolymer is ethylene methyl acrylate.

54. The process of claim 44, wherein the ethylene copolymer is present in an amount of from 2 to 13% by weight of the composition.

55. A polyolefin composition, comprising:

(a) about 99 to 70% by weight polyolefin;

(b) 0.1 to 15% by weight polyester; and (c) a selected amount of a polar group material comprising an ethylene copolymer comprising 70 to 82% and about 30 to 18% by weight of an alkyl acrylate wherein the alkyl acrylate has 1 to 4 carbon atoms, the alkyl acrylate being present in an amount of from 0.2 to 3.0% by weight of the composition.

56. The composition of claim 55, wherein the polyester comprises from 1 to 10% by weight of the composition.

57. The composition of claim 55, wherein at least a portion of the ethylene copolymer is grafted onto the polyolefin.

58. The composition of claim 55, wherein the alkyl acrylate is present in an amount of 0.5 to 2.4% by weight of the composition.

59. The composition of claim 55, wherein the ethylene copolymer is present in an amount of from 2 to 13% by weight of the composition.

60. The composition of claim 55, further comprising:

a hydrophilic modifier in an amount by weight of from 0.1 to 2.0% of the composition, the hydrophilic modifier comprising a monoglyceride and a long chain hydrocarbon with a hydrophilic group.

61. The composition of claim 60, wherein the long chain hydrocarbon with a hydrophilic group comprises an alkyl phosphate.

62. The composition of claim 60, wherein the monoglyceride is glycerol monosterate, and the glycerol monosterate and the long chain hydrocarbon with a hydrophilic group are fused.

63. A process for forming a dyeable polyolefin composition, comprising:

(a) introducing a sulfonic group during polymerization of polyester to form a sulfopolyester;

(b) forming a composition including about 99 to 70% by weight polyolefin, 0.1 to 15% by weight sulfopolyester, and a polar group material, the polar group material selected from a group consisting of (1) an ethylene copolymer, the ethylene copolymer comprising about 70 to 82% by weight ethylene and about 30 to 18% by weight of an alkyl acrylate wherein the alkyl has one to four carbon atoms, the alkyl acrylate present in the composition in an amount of from 0.2 to 3.0% by weight of the composition, (2) a maleic anhydride comprising about 0.1 to 10% by weight of the composition, and (3) an acrylic acid comprising about 0.1 to 2.0% by weight of the composition; and (c) exposing the composition to a cationic dye.

64. The process of claim 63, wherein the polyester comprises from 1 to 10% by weight of the composition.

65. The process of claim 63, further comprising:

a hydrophilic modifier comprising at least 50% by weight a monoglyceride and a long chain hydrocarbon with a hydrophilic group, the hydrophilic modifier being in an amount by weight of about 0.1 to 2% of the composition.

66. The process of claim 65, wherein the long chain hydrocarbon with a hydrophilic group comprises alkyl phosphate having a hydrocarbon chain length of from 14 to 18 carbons.

67. The process of claim 65, wherein the monoglyceride and the long chain hydrocarbon with a hydrophilic group are fused.

68. The process of claim 65, wherein the monoglyceride is glycerol monosterate.

69. The process of claim 63, wherein the polar group material is an ethylene copolymer.

70. The process of claim 69, wherein the ethylene copolymer is ethylene methyl acrylate.

71. The process of claim 63, wherein the polar group material is an ethylene copolymer and the ethylene copolymer is present in an amount of from 2 to 13% by weight of the composition.

72. A polyolefin composition, comprising:

(a) about 99 to 70% by weight polyolefin;

(b) 0.1 to 15% by weight sulfopolyester formed by introducing a sulfonic group during polymerization of polyester; and (c) a selected amount of a polar group material selected from a group consisting of (1) an ethylene copolymer comprising 70 to 82% and about 30 to 18% by weight of an alkyl acrylate wherein the alkyl acrylate has 1 to 4 carbon atoms, the alkyl acrylate being present in an amount of from 0.2 to 3.0% by weight of the composition, (2) a maleic anhydride comprising about 0.1 to 10% by weight of the composition, and (3) an acrylic acid comprising about 0.1 to 2.0% by weight of the composition.

73. The composition of claim 72, wherein the polyester comprises from 1 to 10% by weight of the composition.

74. The composition of claim 72, wherein the polar group material is ethylene copolymer and at least a portion of the ethylene copolymer is grafted onto the polyolefin.

75. The composition of claim 72, wherein the polar group material is ethylene copolymer and the alkyl acrylate is present in an amount of 0.5 to 2.4% by weight of the composition.

76. The composition of claim 72, wherein the polar group material is an ethylene copolymer and the ethylene copolymer is present in an amount of from 2 to 13% by weight of the composition.

77. The composition of claim 72, further comprising:

a hydrophilic modifier in an amount by weight of from 0.1 to 2.0% of the composition, the hydrophilic modifier comprising a monoglyceride and a long chain hydrocarbon with a hydrophilic group.

78. The composition of claim 77, wherein the long chain hydrocarbon with a hydrophilic group comprises alkyl phosphate.

79. The composition of claim 77, wherein the monoglyceride is glycerol monosterate, and the glycerol monosterate and the long chain hydrocarbon with a hydrophilic group are fused.

80. A process for forming colored fibers from a polypropylene-based composition, comprising:

(a) combining polypropylene with an ethylene copolymer of about 70 to 82% by weight ethylene and about 30 to 18% by weight of an ethylene alkyl acrylate wherein the alkyl group has 1 to 4 carbon atoms to form a composition, the alkyl acrylate present in the composition in an amount of from 0.2 to 3.0% by weight of the polypropylene;

(b) adding a sulfopolyester by weight from 0.1 to 15% of the composition, the sulfopolyester including a sulfonic group introduced during polymerization of polyester;

(c) extruding the composition into fibers; and (d) exposing the fibers to a cationic dye to color the fibers.

81. The process of claim 80, further comprising:

the polypropylene being from 99 to 70% by weight of the composition; and grafting the ethylene copolymer onto the polypropylene prior to adding the polyester.

82. The process of claim 80, wherein the polyester comprises from 1 to 10 % by weight of the composition.

83. The process of claim 80, further comprising:

a hydrophilic modifier comprising at least 50% by weight a monoglyceride and a long chain hydrocarbon with a hydrophilic group, the hydrophilic modifier being in an amount by weight of about 0.1 to 2% of the composition.

84. A polypropylene-based fiber composition, comprising:

(a) about 99 to 70% by weight polypropylene;

(b) about 0.1 to 15% by weight sulfopolyester, the sulfopolyester including a sulfonic group introduced during polymerization of polyester; and (c) an ethylene copolymer comprising 70 to 82% and about 30 to 18% by weight of an alkyl acrylate wherein the alkyl acrylate has 1 to 4 carbon atoms, said alkyl acrylate being present in an amount of from 0.2 to 3.0% by weight of the composition.

85. The composition of claim 84, further comprising:

a hydrophilic modifier in an amount by weight of from 0.1 to 2.0% of the composition, the hydrophilic modifier comprising a monoglyceride and a long chain hydrocarbon with a hydrophilic group.

86. The composition of claim 85, wherein the long chain hydrocarbon with a hydrophilic group comprises alkyl phosphate.

87. The composition of claim 85, wherein the monoglyceride is glycerol monosterate, and the glycerol monosterate and the long chain hydrocarbon with a hydrophilic group are fused.

88. The composition of claim 84, wherein the polyester comprises from 1 to 10% by weight of the composition.

89. The composition of claim 84, wherein at least a portion of the ethylene copolymer is grafted onto the polypropylene.

90. The composition of claim 84, wherein the alkyl acrylate is present in an amount of 0.5 to 2.4% by weight of the composition.

91. The composition of claim 84, wherein the ethylene copolymer is present in an amount of from 2 to 13% by weight of the composition.

* * * * *

UNITED STATES PATENT AND TRADEMARK OFFICE
CERTIFICATE OF CORRECTION

PATENT NO. : 5,576,366
DATED : November 19, 1996
INVENTOR(S) : Paresh J. Sheth

It is certified that error appears in the above-indentified patent and that said Letters Patent is hereby corrected as shown below:

In column 24, line 34, change "claim 33" to --claim 29--.

In column 25, line 4, change "the glycol" to --the glycerol--.

In column 26, line 22, change "dyeable" to --dyed--.

Signed and Sealed this

Eighteenth Day of March, 1997

Attest:

BRUCE LEHMAN

*Attesting Officer*   Commissioner of Patents and Trademarks